(12) United States Patent
Igarashi

(10) Patent No.: US 7,693,155 B2
(45) Date of Patent: Apr. 6, 2010

(54) METHOD AND SYSTEM FOR TRANSMITTING STREAMING DATA

(75) Inventor: Tatsuya Igarashi, Tokyo (JP)

(73) Assignee: Sony Corporation, Tokyo (JP)

( * ) Notice: Subject to any disclaimer, the term of this patent is extended or adjusted under 35 U.S.C. 154(b) by 741 days.

(21) Appl. No.: 11/514,126

(22) Filed: Sep. 1, 2006

(65) Prior Publication Data

US 2007/0064609 A1    Mar. 22, 2007

(30) Foreign Application Priority Data

Sep. 6, 2005   (JP) .......................... P2005-257855

(51) Int. Cl.
  *H04L 12/56* (2006.01)
  *H04L 12/28* (2006.01)
  *H04L 12/26* (2006.01)

(52) U.S. Cl. ................................. 370/395.4; 370/230

(58) Field of Classification Search ............... None
  See application file for complete search history.

(56) References Cited

U.S. PATENT DOCUMENTS

| | | | |
|---|---|---|---|
| 6,539,205 B1 * | 3/2003 | Wan et al. | 370/465 |
| 2002/0097678 A1 * | 7/2002 | Bisher et al. | 370/232 |
| 2003/0107991 A1 * | 6/2003 | Tezuka et al. | 370/229 |
| 2004/0205231 A1 * | 10/2004 | Clarke et al. | 709/237 |

FOREIGN PATENT DOCUMENTS

| | | |
|---|---|---|
| JP | 2000-024662 | 1/2000 |
| JP | 2002-247090 | 8/2002 |
| JP | 2005-198008 | 7/2005 |
| WO | WO 2004-019521 | 3/2004 |

OTHER PUBLICATIONS

Bianchi G. et al.; "Throughout analysis of end-to-end measurement-based admission control in IP"; INFOCOM 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, vol. 3, Mar. 26, 2000, pp. 1461-1470, XP010376083.

(Continued)

*Primary Examiner*—Kevin C Harper
*Assistant Examiner*—Steven Wood
(74) *Attorney, Agent, or Firm*—Finnegan, Henderson, Farabow, Garrett & Dunner, L.L.P.

(57) ABSTRACT

A communication processing apparatus that performs processing of transmitting streaming data includes a communication control portion examining the state of data communication and performing processing of changing priority information to be defined for send data based on the result of the examination, and a network interface performing processing of outputting data with the priority information. In this case, the communication control portion performs processing of setting a lower priority than a predetermined priority for the streaming data in the initial period of the transmission of streaming data, examination of the state of data communication in a lower-priority-setting period at an examination point functioning as predefined examination timing, and processing of changing the priority setting based on the result of the examination.

10 Claims, 11 Drawing Sheets

OTHER PUBLICATIONS

Choi S et al., "IEEE 802.11E Contention-based Channel Access (EDCF) Performance Evaluation", ICC 2003. 2003 IEEE International Conference on Communications. Anchorage, AL, May 11-15, 2003, IEEE International Conference on Communications, New York, NY: IEEE, US, vol. 2 of 5, May 11, 2003, pp. 1151-1156, XP008056918.

Mase K. et al., "An efficient end-to-end measurement based admission control for VoIP networks", Communications, 2004 IEEE International Conference on Paris, France Jun. 20-24, 2004, Piscataway, MY, USA, IEEE, Jun. 20, 2004, pp. 1877-1881, XP010710178.

Mase K., "Toward Scalable Admission Control for VoIP Networks", IEEE Communications Magazine, IEEE Service Center, New York, NY, US, vol. 42, No. 7, Jul. 2004, pp. 42-47, XP001200763.

* cited by examiner

FIG. 2

| Access Category | Description |
|---|---|
| WMM Voice Priority | Highest priority<br>Allows multiple concurrent VoIP calls, with low latency and toll voice quality |
| WMM Video Priority | Prioritize video traffic above other data traffic<br>One 802.11g or 802.11a channel can support 3-4 SDTV streams or 1 HDTV streams |
| WMM Best Effort Priority | Traffic from legacy devices, or traffic from applications or devices that lack QoS capabilities<br>Traffic less sensitive to latency, but affected by long delays, such as Internet surfing |
| WMM Background Priority | Low priority traffic (file downloads, print jobs) that does not have strict latency and throughput requirements |

FIG. 7

| Priority | Type Of Transmission To Use | 802.1D Priority | WMM Access Category | DSCP |
|---|---|---|---|---|
| (a) QOS_CONTROL | Management Protocol For Network (Highest Priority) | 7 | VO | 0x38 |
| (b) QOS_STREAMING | Streaming of AV Contents | 5 | VI | 0x28 |
| (c) QOS_INTERACTIVE | Interactive File Transfer | 0 | BE | 0x00 |
| (d) QOS_BACKGROUND | File Transfer In The Background (Lowest Priority) | 1 | BK | 0x08 |

METHOD AND SYSTEM FOR TRANSMITTING STREAMING DATA

CROSS REFERENCES TO RELATED APPLICATIONS

The present invention contains subject matter related to Japanese Patent Application JP2005-257855 filed in the Japanese Patent Office on Sep. 6, 2005, the entire contents of which being incorporated herein by reference.

BACKGROUND OF THE INVENTION

1. Field of the Invention

The present invention relates to a communication processing apparatus, a communication control method and a computer program. In particular, the invention relates to a communication processing apparatus, communication control method and computer program that perform proper control for preventing an adverse effect on an existing communication stream by applying Admission control in a construction in which data communication is performed by using priority-based QoS (Quality of Service).

2. Description of the Related Art

With the wide spread of data communication over a network such as the Internet and a LAN, many households apply a home network including the connection of a household electric appliance, a computer and other peripherals over a network. The home network may allow, for example, the exchange of contents between network-connected equipment, provide the convenience and comfort to users and will be spread increasingly in the future.

So-called streaming data distribution and reproduction processing in which a client side can simultaneously receive and reproduce data is allowed by, for example, defining, as a server, equipment having a receiving portion such as a tuner provided in a household and a storage unit such as a hard disk and transmitting contents such as a movie held by the server to a client apparatus such as a PC that a user has over a network.

The server that performs such streaming data distribution performs data processing such as encoding and creates and outputs send data to the network. On the other hand, the client that reproduces the streaming data temporarily stores received data in a buffer and then performs decoding processing and reproduction processing sequentially.

However, multiple pieces of communication data may conflict over the network. When the conflict among multiple pieces of communication data occurs, the communication band may be insufficient, and a problem such as delay of the distribution of the streaming data may occur. Various constructions for controlling conflicting communication data have been proposed. For example, Patent Document 1 discloses a construction allowing communication by defining a conflicting transmission domain in which communication stations conflict to transmit information and a priority transmission domain in which a band with a higher priority is defined to transmit information and choosing the conflicting transmission domain or the priority transmission domain based on the buffer-stored amount in a communication station.

QoS (Quality of Service) has been known as a communication control construction for guaranteeing the quality of data transmission. QoS may perform control in which a band is assigned to each communication data based on the priority. For example, in order to implement realtime reproduction in streaming data distribution of moving pictures, a packet included in the moving pictures may be required to transmit from a streaming server to a streaming client without delay. On the other hand, some data packets may allow delay in time. The communication packet to be transferred over a network may undergo communication control processing based on the identification of the processing priority.

A data transfer control apparatus such as a router and a switch connecting to a network, for example, may function as a communication control processing apparatus for providing QoS, that is, for guaranteeing the quality of data transfer. Various methods for defining priorities have been proposed including a method defining priorities in data flows, each of which is identified by a sender address and a receiver address, QoS based on band reservations and QoS based on priorities in which communication control is performed based on the priority added to a packet.

IEEE (The Institute of Electrical and Electronics Engineers) 802.1D (which may be called 802.1p priority), which is one of standard specifications relating to a wireless network, specifies a system of priority-based QoS for performing communication control based on the priority added to a packet in a wired LAN such as an Ethernet (registered trademark). Wi-Fi forum specifies priority-based WMM (Wi-Fi Multimedia), which is a subset of 802.11e. 802.11e is a QoS specification for a wireless LAN. These priority-based QoS technologies are easier to implement and more effective than the band-reservation-based QoS. Thus, Digital Living Network (DLN), which is an industrial standard of home network technologies, will adopt both 802.1D and WMM.

For example, the streaming data distribution of two AV contents may have a same priority defined and be performed in parallel in accordance with DLNA (Digital Living Network Alliance) guideline specified by Digital Living Network (DLN), which is an industrial standard of home network technologies. In this case, however, when the network band is not sufficient for transmitting the two lines of streaming, both of the two lines of streaming may not maintain a sufficient transfer rate for performing realtime reproduction at a client. Thus, both of the two pieces of streaming data may have turbulence in reproduced images and/or voice interruption at the client, which is a problem.

In order to solve the problem, a system of Admission Control has been proposed which manages the communication traffic on a network unitedly, examines whether realtime reproduction is available or not when a new line of streaming is started, and permits the start of data distribution only if available. However, the system is complex to implement and has not been embodied yet. Furthermore, the problem on the operation of the policy of Admission Control has not been solved yet.

Patent Document 1: JP-A-2005-198008

SUMMARY OF THE INVENTION

Accordingly, it is desirable to propose a communication processing apparatus, communication control method and computer program, which implement proper control over conflicting communications by applying Admission Control in a construction in which data communication is performed by applying priority-based QoS (Quality of Service).

According to an embodiment of the present invention, there is provided a communication processing apparatus that performs processing of transmitting streaming data, the apparatus including:

a communication control portion examining the state of data communication and performing processing of changing priority information to be defined for send data based on the result of the examination; and a network interface performing processing of outputting data with the priority information, wherein the communication control portion performs:

processing of setting a lower priority than a predetermined priority for the streaming data in the initial period of the transmission of streaming data;

examination of the state of data communication in a lower-priority-setting period at an examination point functioning as predefined examination timing; and processing of changing the priority setting based on the result of the examination.

In the communication processing apparatus according to the embodiment of the invention, the communication control portion may:

in order to examine the state of communication at the examination point, determine whether the determination equation below:

(time from the start of data transmission to the examination point)<(time for reproducing data transmitted from the start of the data transmission to the examination point)

is satisfied or not where the determination equation compares the time from the start of data transmission to the examination point and the time for reproducing data transmitted from the start of the data transmission to the examination point; and if the determination equation is satisfied, perform the processing of changing the setting to the predetermined priority for the streaming data.

In the communication processing apparatus according to the embodiment of the invention, the communication control portion may:

in order to examine the state of communication in the lower-priority-setting period; and in order to examine the state of communication at the examination point, determine whether the determination equation below:

(examination point)−(decoding starting point at data receiving client)<(time for reproducing send data to the examination point)−(time for reproducing pre-buffered data at data receiving client)

is satisfied or not; and if the determination equation is satisfied, perform processing of changing the setting to the predetermined priority for the streaming data.

In the communication processing apparatus according to the embodiment of the invention, the communication control portion may receive information on at least either the amount of pre-buffered data at the client or the decoding starting time from the data receiving client and performs processing of examination based on the determination equation.

In the communication processing apparatus according to the embodiment of the invention, the communication control portion may perform processing of reducing the send bit rate of send data and perform processing of continuing the data transmission if the processing of changing the setting to the predetermined priority is determined not to perform as a result of the examination of the state of communication at the examination point.

In the communication processing apparatus according to the embodiment of the invention, the communication control portion may perform at least either processing of stopping the data transmission or the processing of notification to a user if the processing of changing the setting to the predetermined priority is determined not to perform as a result of the examination of the state of communication at the examination point.

In the communication processing apparatus according to the embodiment of the invention, the communication control portion may obtain the amount of send data in data transmission processing under HTTP based on the amount of written HTTP response data to a TCP stack and perform processing of examining the state of communication based on the obtained amount of send data.

According to another embodiment of the invention, there is provided a communication control method for streaming data, the method including:

a lower-priority-setting data transmitting step of defining a lower priority than a predetermined priority for the streaming data and performing the data transmission in the initial period of the transmission of streaming data;

a communication state examining step of performing examination of the state of data communication in a lower-priority-setting data transmission period at an examination point functioning as predefined examination timing; and a priority changing step of performing processing of changing the priority setting based on the result of the examination in the communication state examining step.

In the communication control method according to the embodiment of the invention, the communication state examining step:

in order to examine the state of communication at the examination point, may determine whether the determination equation below:

(time from the start of data transmission)<(time for reproducing data transmitted from the start of the data transmission to the examination point)

is satisfied or not where the determination equation compares the time from the start of data transmission to the examination point and the time for reproducing data transmitted from the start of the data transmission to the examination point; and the priority changing step:

if the determination equation is satisfied, may perform the processing of changing the setting to the predetermined priority for the streaming data.

In the communication control method according to the embodiment of the invention, the communication state examining step:

in order to examine the state of communication in the lower-priority-setting period; and in order to examine the state of communication at the examination point, may determine whether the determination equation below:

(examination point)−(decoding starting point at data receiving client)<(time for reproducing send data to the examination point)−(time for reproducing pre-buffered data at data receiving client)

is satisfied or not; and the priority changing step:

if the determination equation is satisfied, may perform processing of changing the setting to the predetermined priority for the streaming data.

In the communication control method according to the embodiment of the invention, the communication state examining step may receive information on at least either the amount of pre-buffered data at the client or the decoding starting time from the data receiving client and performs processing of examination based on the determination equation.

The communication control method according to the embodiment of the invention may further include the step of performing processing of reducing the send bit rate of send data if the processing of changing the setting to the predetermined priority is determined not to perform as a result of the examination of the state of communication in the communication state examining step.

The communication control method according to the embodiment of the invention may further include the step of performing at least either processing of stopping the data transmission or the processing of notification to a user if the processing of changing the setting to the predetermined priority is determined not to perform as a result of the examination of the state of communication in the communication state examining step.

In the communication control method according to the embodiment of the invention, the communication state examining step may obtain the amount of send data in data transmission processing under HTTP based on the amount of written HTTP response data to a TCP stack and perform processing of examining the state of communication based on the obtained amount of send data.

According to another embodiment of the invention, there is provided a computer program causing a communication processing apparatus, which performs processing of transmitting streaming data, to perform communication control processing, the program including:

a lower-priority-setting data transmitting step of defining a lower priority than a predetermined priority for the streaming data and performing the data transmission in the initial period of the transmission of streaming data;

a communication state examining step of performing examination of the state of data communication in a lower-priority-setting data transmission period at an examination point functioning as predefined examination timing; and a priority changing step of performing processing of changing the priority setting based on the result of the examination in the communication state examining step.

It should be noted that the computer program according to the embodiment of the invention is available to a general computer system in which various program codes are executable, communication medium, for example, a recording medium through a computer-readable storage medium such as a CD, an FD and an MO and a communication medium such as a network. Providing the program in a computer-readable manner can implement processing in accordance with the program on the computer system.

Further objects, features and advantages of the invention will be apparent from further descriptions based on embodiments of the invention, which will be described later, and attached drawings. It should be noted that the term, "system", herein refers to a logical set construction of multiple apparatus, not limiting to component apparatus within one cabinet.

In the construction according to embodiments of the invention, a communication processing apparatus (server) that distributes streaming data starts data transmission with a lower priority defined than the priority corresponding to original streaming data distribution upon start of data transmission and examines the state of communication in a period with the low priority at an examination point. For example, based on the comparison between the time until an examination point and the time required for reproducing the amount of data transferred until the examination point, the occurrence of the deletion of the buffer at a client and the state of assignment of a band for streaming data distribution are determined. Then, only if it is determined that an enough band is provided based on the determination, data distribution is performed with original priority setting for streaming data distribution. Thus, when the distribution of new streaming data is started while another streaming distribution is being performed, a good communication atmosphere may be maintained without communication interference that the band for the existing streaming distribution is used, resulting in a delay in the existing streaming distribution.

BRIEF DESCRIPTION OF THE DRAWINGS

FIG. 2 is a diagram showing Access Categories (AC) defined by WMM;

FIG. 7 is a diagram showing a priority correspondence table storing four levels of priority, types of transmission and set values to be used in a home AV network such as DLNA;

DESCRIPTION OF THE PREFERRED EMBODIMENTS

Details of a communication processing apparatus, communication control method and computer program according to embodiments of the invention will be described below with reference to drawings.

Figure 1:
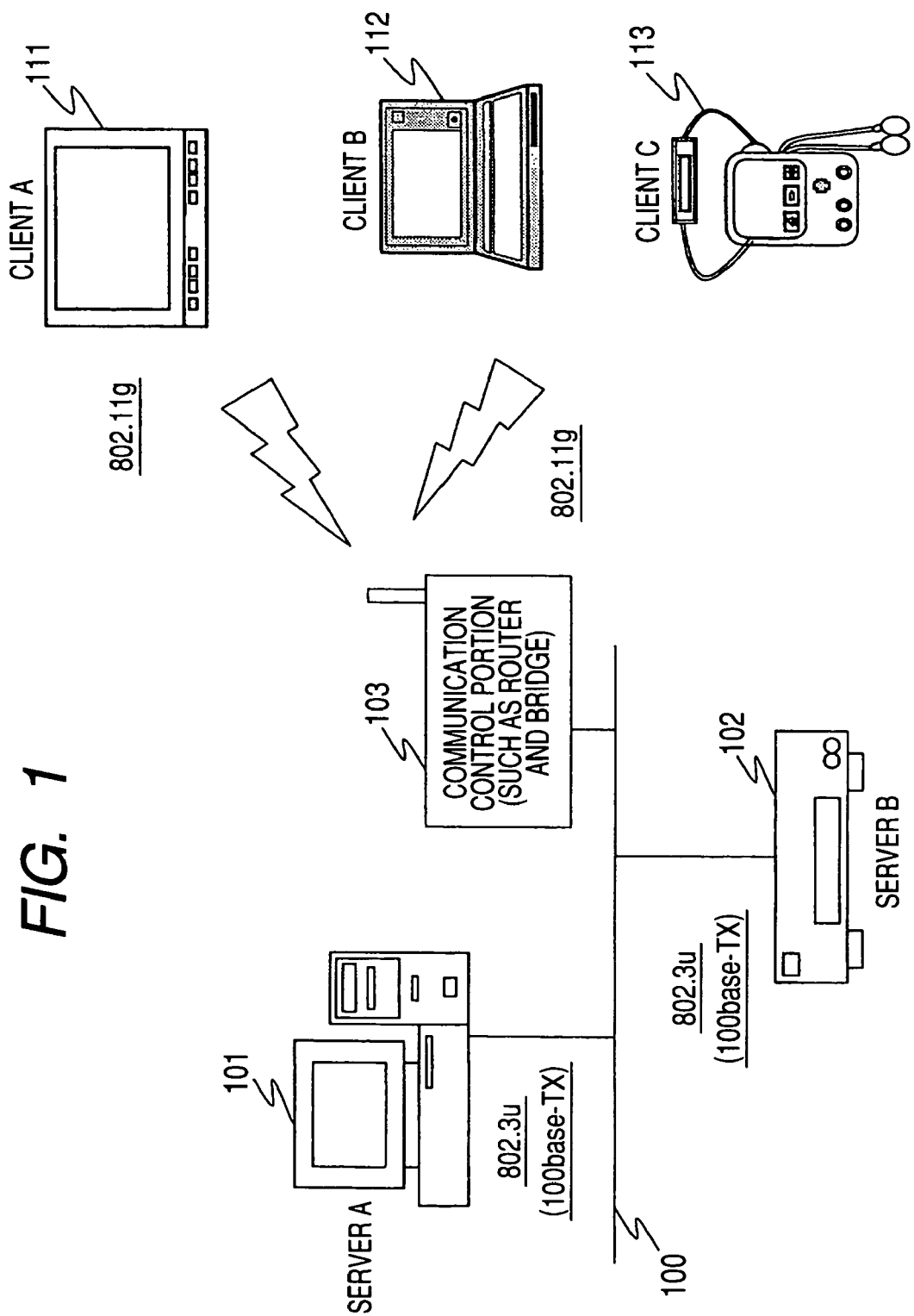
FIG. 1 is a diagram showing a network construction example according to an embodiment of the invention.

Referring to FIG. 1, a network configuration example according to an embodiment of the invention will be described first of all. FIG. 1 shows a configuration example of a network such as a home network having a servers A101 and B102 functioning as communication processing apparatus, which perform contents distribution, and clients A111 to C113 functioning as contents receiving apparatus, which perform processing request to a server. The clients A111 to C113 may be various equipment such as a TV, a personal computer (PC), a mobile terminal and a player.

The communication among the servers A101 and B102 and the clients A111 to C113 is relayed and controlled by a communication control portion 103 functioning as a packet exchange including a router and a bridge, for example. The servers A101 and B102 and the communication control portion 103 are connected via a wired LAN 100 and perform communication over the wired LAN 100. For example, wired LAN communication compliant with IEEE802.3u (100base-TX) is implemented therein. On the other hand, the communication between the communication control portion 103 and the clients A111 to C113 is performed by wireless LAN communication under IEEE102.11b specification.

The servers A101 and B102 implement the distribution of streaming data such as moving picture contents to the clients A111 to C113. The realtime reproduction, in the clients A111 to C113, of streaming data distributed from the servers A101 and B102 may require the receipt of a packet of moving pictures from the servers without delay.

The communication control portion 103 includes a home router, for example. The home router may be generally used for Internet connection but provides a bridge function for connection in a home network. Video contents, for example, stored in the server A101 or B102 may be stored and transmitted in a packet as communication data based on wireless LAN 802.11g from wired LAN 802.3u to the clients A111 to C113 through two link layers of wireless LAN 802.11g in the communication control portion 103.

The communication control portion 103 including a home router performs processing of band allocation by using a priority-based QoS technology. In other words, the communication control portion 103 performs priority-based control over conflicting communications, that is, band allocation in accordance with priority information defined in the packet.

In a construction in which a network as shown in FIG. 1 is applied to implement streaming distribution of AV contents, for example, from a server to a client, a communication processing apparatus according to an embodiment of the invention, that is, the servers 101 and 102 perform communication control preventing interfering the streaming distribution, which is being executed over the network, in order to start a new line of streaming. In other words, the server itself starting a new line of streaming performs control in order to prevent the influence of the turbulence, for example, of the reproduction of streaming data being executed over the network. The processing to be performed by the server functioning as the communication processing apparatus according to an embodiment of the invention will be described below in detail.

First of all, the specification under examination for implementing priority-based QoS and the effects from the use of priority-based QoS will be described. WMM (Wi-Fi Multimedia) promoted by Wi-Fi forum defines four Access Categories (AC) quoted out of IEEE802.1D as priority information for communication data. This corresponds to four levels of priority of 802.11e EDCF (Enhanced Distributed Coordination Function). FIG. 2 shows Access Categories (AC) defined by WMM.

As shown in FIG. 2, WMM defines access categories as four levels of priority information. That is, from communication data with the highest priority, four access categories:
  (a) Voice Priority (WMM Voice Priority);
  (b) Video Priority (WMM Video Priority);
  (c) Best Effort Priority (WMM Best Effort Priority); and
  (d) Background Priority (WMM Background Priority) are defined.

For example, a server application executing data transmission based on communication control by priority-based QoS performs processing of defining an Access Category as priority information to a data packet to be transmitted. Furthermore, the communication control portion 103 such as a home router as shown in FIG. 1 receives a packet from a server over a wired LAN and transmits the data packet to a wireless LAN based on the priority after informing the Access Category to the link layers of the wireless LAN through an application programming interface (API).

Figure 3A:
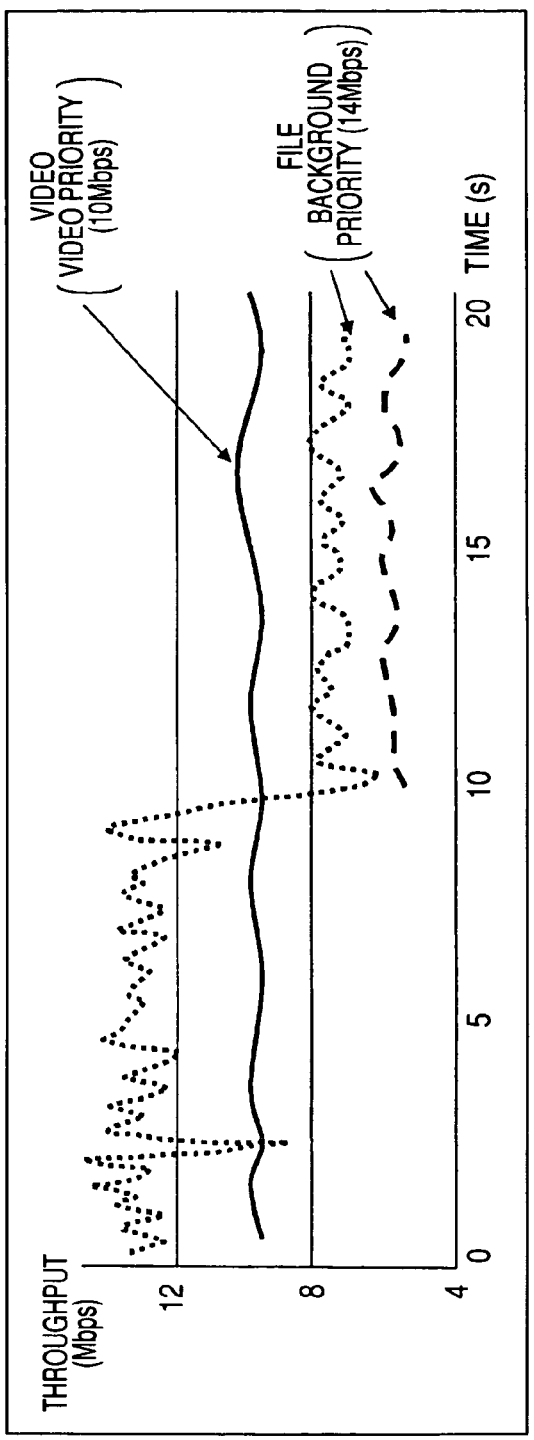
FIGS. 3A and 3B are diagrams showing effects in communication processing applying Access Categories functioning as priority information defined by WMM.
Figure 3B:
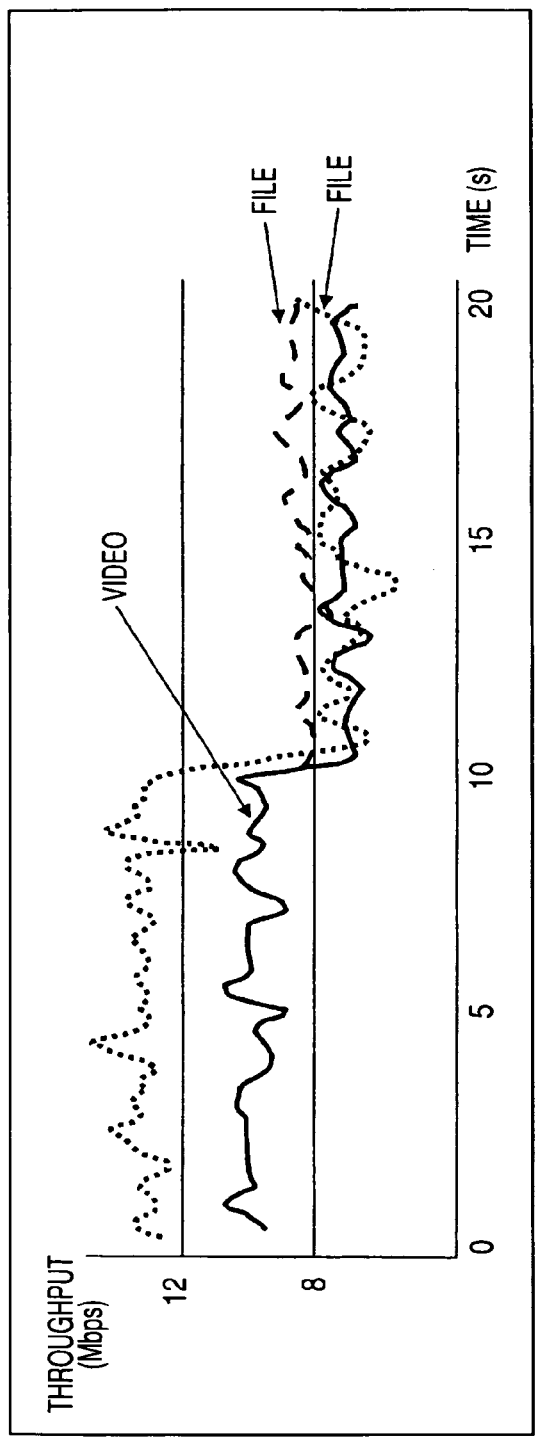

FIGS. 3A and 3B are diagrams showing effects in communication processing applying an Access Category as priority information defined by WMM. FIGS. 3A and 3B show changes in throughputs of communication data with the passage of time in communication processing applying an Access Category as priority information defined by WMM and communication processing not applying an Access Category, respectively.

In FIGS. 3A and 3B, the solid lines and two types of broken line indicate video streaming and throughputs of communication for file transfer, respectively. In the first about ten seconds from the start of communication, a sufficient band (such as 30 Mbps for the entire wireless LAN) is available for the transfer of video streaming (indicated by the solid line: 10 Mbps) and file transfer (indicated by the broken line: 14 Mbps). Then, at the point in time after about ten seconds from the start of the communication, another line of file transfer of 14 Mbps is added.

In the communication processing applying Access Categories as priority information defined by WMM shown in FIG. 3A, even after another line of file transfer of 14 Mbps is added at the point in time after about ten seconds from the start of the communication, the video streaming indicated by the solid line is transferred with no influences therefrom. However, in the communication processing not applying Access Categories as priority information defined by WMM shown in FIG. 3B, the transfer of video streaming indicated by the solid line is influenced by the new file transfer, and the transfer rate is reduced.

In the example shown in FIG. 3B, the two line of file transfer communication decrease the available band and throughputs for the video streaming. Thus, at a client receiving the distribution of the streaming, the image and/or sound/voice reproduced from the received AV data may be interrupted.

In the communication processing applying Access Categories as priority information defined by WMM shown in FIG. 3A, the Access Category as priority information defined for a communication packet of video streaming data indicated by the solid line is [Video Priority (WMM Video Priority)], which is a higher priority than the Access Category [Background Priority (WMM Background Priority)] defined for a file transfer packet. Thus, the band is allocated with a higher priority to the video streaming data indicated by the solid line, resulting in the continuation of the distribution of the streaming data without any decrease in band due to the new line of file transfer.

In this way, the implementation of the communication processing applying Access Categories as priority information defined by WMM, for example, may handle the distribution of communication data with a higher priority in the priority order, which can guarantee a sufficient band available and prevent a reproduction error on the client side.

In the communication processing according to an embodiment of the invention, the priority-based control is performed over conflicting communications based on the priority-based QoS technology, and the server itself starting a new line of streaming performs the priority control. In other words, the server trying to start new distribution of streaming data performs communication control in order not to give a large influence on the streaming distribution, which is being executed over a network.

Figure 4:
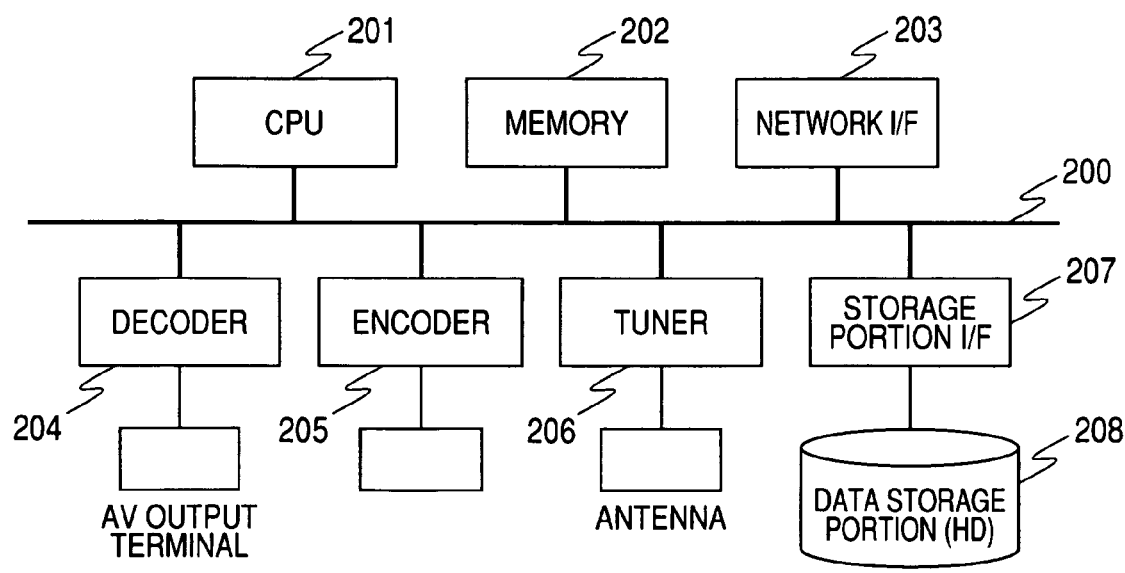
FIG. 4 is a diagram showing a hardware construction example of a server functioning as a communication processing apparatus performing data transmission processing according to an embodiment of the invention.

FIG. 4 shows a hardware configuration example of a server functioning as a communication processing apparatus, which performs data transmission processing according to an embodiment of the invention. The hardware configuration of the communication processing apparatus shown in FIG. 4 may be a configuration of the server 101 or server 102 shown in FIG. 1, for example. The hardware configuration includes a CPU 201, a memory 202, a network I/F 203, a decoder 204, an encoder 205, a tuner 206, a data storage portion 208 and a storage portion I/F 207. The CPU 201 performs entire control over data processing and communication processing and functions as a communication control portion. The memory 202 may be applied for a storage area for data processing, communication processing programs and programs for an OS and for a work area for the execution of the programs. The network I/F 203 functions as a communication interface over a wired and wireless network. The decoder 204 performs decoding processing (such as MPEG decoding) on AV data. The encoder 205 performs encoding processing on AV data. The tuner 206 inputs AV contents by receiving broadcasting waves. The data storage portion 208 may be a hard disk. The storage portion I/F 207 performs data input/output control over the data storage portion. The data transfer is performed among these processing portions via a bus 200.

For example, television broadcasting may be received by the tuner 206, and the received AV data including video images and sounds is encoded and compressed to video data of MPEG2, for example, and sound data of MPEG1-Audio-Layer2 by the encoder 205, resulting in a PS stream thereof. The PS stream created by the encoding processing is stored in the data storage portion 208 such as a hard disk (HD) through the storage portion I/F 207. The data processing control is performed by the execution of the OS and/or application program stored on the memory 202 by the CPU 201.

In order to reproduce contents recorded in the data storage portion 208 such as a hard disk, the contents is read out from the data storage portion 208 through the storage portion I/F 207, is transferred to the decoder 204, is expanded by decoding processing and is output in an analog form from an AV output terminal. The AV output terminal may be connected to a television, for example, and can reproduce the video and/or voice/sounds of the recorded contents.

The communication processing apparatus shown in FIG. 4 further has a server function that performs streaming distribution of the contents recorded in the data storage portion 208 such as a hard disk to other client equipment through the network I/F 203. In order to implement these functions, a network protocol based on the guideline of the DLNA (Digital Living Network Alliance) is implemented therein.

Figure 5:
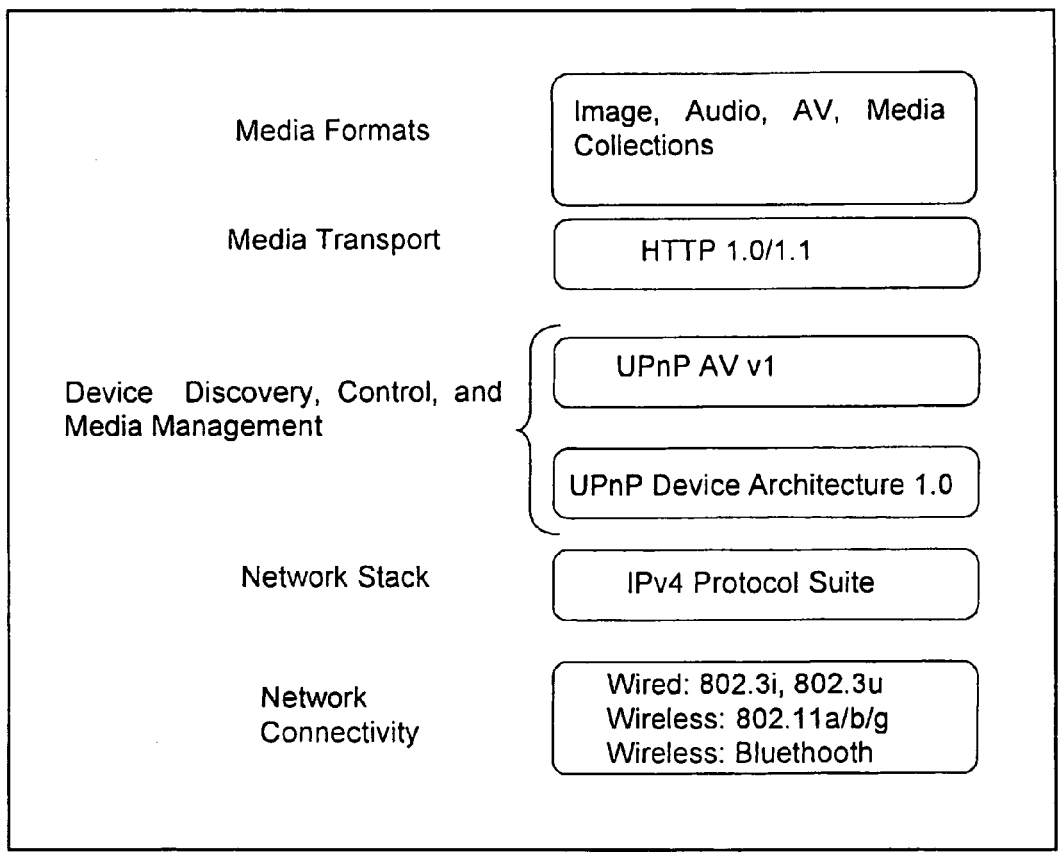
FIG. 5 is a diagram showing functional components under DLNA guideline.

FIG. 5 shows functional components of the DLNA guideline. The components including, from the top, a media format, a medial transport, a device discovery control and media management, a network stack and a network connection are defined. The communication processing apparatus (server) shown in FIG. 4 has a function of performing data communication, that is, distribution of streaming data to a client in accordance with a network protocol based on the guideline of DLNA (Digital Living Network Alliance) with respect to the basic components shown in FIG. 5.

The AV contents recorded in the data storage portion 208 such as a hard disk in the communication processing apparatus (server) shown in FIG. 4 is contents based on the media format profile of MPEG2PS_NTSC (MPEG2 video with a resolution of 720×480 and 29.97 frames per second and MPEG1 audio with Layer2 sampling frequency of 48 kHz and stereo), which may be a required media format defined by DLNA.

The AV contents is encoded as MPEG2 PS stream of 4-10.8 Mbps. The network I/F has an Ethernet (registered trademark) 10 BAST-T/100 BAST-TX (based on 802.3i and 803.3u) and may use a band of 100 Mbps at the maximum for transmission. However, when a wireless LAN of 802.11g, for example, exists in a transmission path, a transmission band of only about 25 Mbps is substantially available. The available band in wireless communication largely depends on the environment where the equipment is provided. Generally two lines or, in a worse case, one line of normal streaming transmission may be performed for the MPEG2 PS stream transmission of 10 Mbps.

Figure 6:
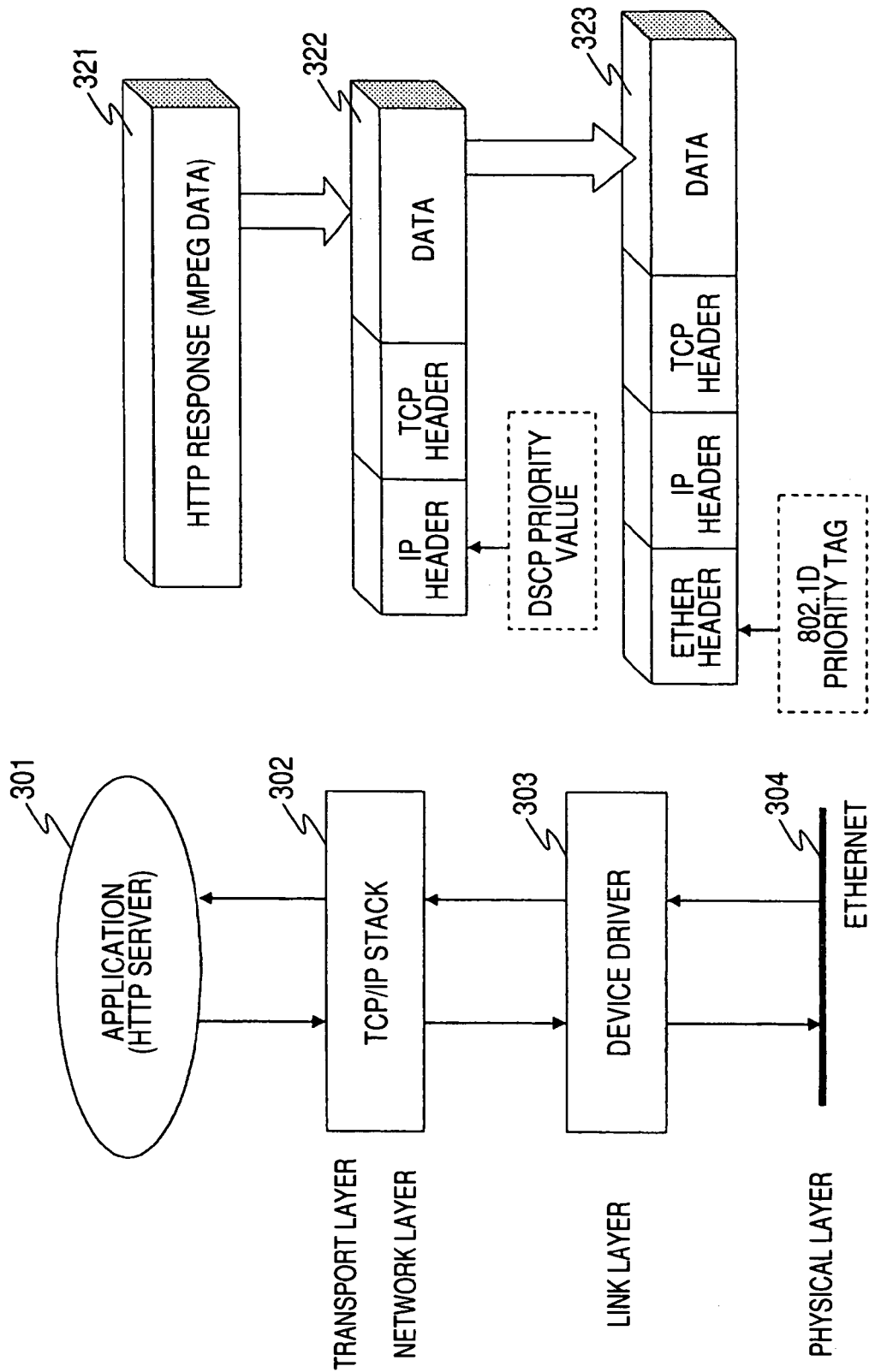
FIG. 6 is a diagram describing an architecture of streaming transmission of AV contents by a communication processing apparatus functioning as a server that performs contents distribution.

Referring to FIG. 6, the architecture for the streaming transmission of AV contents by the communication processing apparatus functioning as a server performing contents distribution will be described. The application responsible for streaming transmission functions as an HTTP server based on HTTP (RFC-2616). For example, the application receives, over a network, an HTTP request as a contents request from a client desiring contents distribution, interprets the received HTTP request, reads out the contents designated by the request from a data storage portion such as a hard disk, creates an HTTP packet storing the contents as payload data for the HTTP response and returns the HTTP packet to the client.

Now, the encapsulation of data will be described with reference to a case with an HTTP response, for example, in which streaming distribution of video contents of MPEG data is performed. An HTTP response includes an HTTP header part in the beginning followed by an HTTP body part. MPEG data is transferred as the HTTP body part.

An application 301 shown in FIG. 6 is a server application functioning as a communication control portion of a server, which is a communication processing apparatus performing contents distribution. The application 301 interprets an HTTP request as a contents request from a client, reads out the contents designated by the request from a data storage portion such as a hard disk, and creates HTTP response data 321 defining the contents as a payload. The application 301 further performs processing of writing the HTTP response data 321 in a TCP stack included in a TCP/IP stack 302 by using an API of the TCP stack.

The HTTP response data 321 as application data written in the TCP stack is divided into TCP packets by the TCP stack. A TCP header is added to each of the TCP packets. Each of the TCP packets are sent from the TCP stack to an IP stack, and an IP packet 322 with an IP header is created therefrom.

An Etherheader of an Ethernet (registered trademark) is added to the IP packet 322 by a device driver 303 and is sent out to a network including an Ethernet (registered trademark) 304 as an Ether frame 323. The Etherheader may be added by an LSI of a network I/F but is performed here by the device driver 303 including the control over the LSI. Under the DLNA guideline, AV contents is generally streaming-transmitted by following the processing flow.

According to an embodiment of the invention, a priority tag indicating an priority as communication priority information defined by IEEE802.1D is defined to the Etherheader of an Ether frame 323 in the packet creating sequence described with reference to FIG. 6. In the embodiment, the processing of adding the priority tag defined by IEEE802.1D is performed by the device driver 303. The application 301 does not directly control the device driver 303 to define the priority tag.

The application 301 defines the API of the TCP/IP stack 302 such that the DSCP (Differentiated Service Code Point) indicating a priority as communication priority information can be added to a TOS field of an IP header of the TCP connection transmitting an HTTP response in streaming transmission.

The DSCP indicating a priority as communication priority information is defined by RFC-2474 or RFC-2475 and is a QoS specification based on priorities in a network layer. The device driver 303 refers to the DSCP priority value added to the IP header of the data received from a higher stack and thereby performs processing of adding the priority tag of 802.1D corresponding to the DSCP priority value defined in the IP header to the Ethernet.

As a result of the processing, the priority tag defined in IEEE802.1D is added only to the Ether frame 323 of streaming transmission desired by the application 301.

This embodiment describes the example of communication processing over an Ethernet (registered trademark), more specifically, the example of processing of adding a priority tag of 802.1D Tag in order to perform communication processing over an Ethernet (registered trademark). On the other hand, in order to perform a communication (such as IEEE 802.11g) applying a wireless LAN, for example, the device driver 303 adds thereto Access Category information corresponding to communication priority information (priority) defined by WMM, which has been described with reference to FIG. 2.

In order to add the Access Category information corresponding to communication priority information (priority) defined by WMM, the device driver 303 also refers to the DSCP priority value added to the IP header of the data received from a higher stack and performs thereby the processing of adding, to the Etherheader, Access Category information defined by WMM corresponding to the DSCP priority value defined in the IP header.

FIG. 7 shows a priority correspondence table storing correspondence relationships among four levels of priority available in a home AV network such as DLNA, types of transmission using them, four priorities, priority values (to be applied in a wired LAN) defined by IEEE 802.1D, Access Categories (to be applied in a wireless LAN) defined by WMM, DSCPs (to be stored in an IP header) indicating priorities defined as communication priority information in the TOS fields of IP headers.

As shown in FIG. 7, the priority correspondence table has priorities as four levels of communication priority information for home AV networks including a wired LAN (802.3i/3u) and a wireless LAN (802.11a/11b/11g). That is, the four types of priority are:

(a) QOS_CONTROL,
(b) QOS_STREAMING,
(c) QOS_INTERACTIVE, and
(d) QOS BACKGROUND

QOS_CONTROL is the highest priority, and processing therewith is performed with the highest priority. However, QOS_CONTROL is not available for transmission of AV contents. Next, QOS_STREAMING is the next highest priority and is available for streaming transmission of AV contents. The transmission of AV contents may require the realtime characteristic and may require the maintenance of transmission at a desired data rate and data transfer with less delay. Thus, a higher priority is defined therefor.

QOS_INTERACTIVE is the next highest priority and is available for transmission of a still image such as a photograph. Though the transmission of a still image may not require the realtime characteristic in data transfer unlike streaming data, a shorter waiting time of a user until the display of a still image may be preferred. Thus, QOS_INTERACTIVE has a higher priority than QOS_BACKGROUND to be used for data transfer such as downloading, copying and uploading of a file.

One of the four types of priority:

(a) QOS_CONTROL,
(b) QOS_STREAMING,
(c) QOS_INTERACTIVE, and
(d) QOS BACKGROUND in the priority correspondence table shown in FIG. 7 is generally defined based on the type of send data, and the communication priority information corresponding to the defined one of the four type of priority, (a) to (d), is defined to a communication thereof.

In other words, as described with reference to FIG. 6 above, the application 301 performing communication processing defines the DSCP value indicating the priority defined as communication priority information into the TOS field of an IP header in accordance with one of the four types ((a) to (d)) of priority shown in FIG. 7 by using the API of the TCP/IP stack 302. That is, one of DSCP values, [0×38], [0×28], [0×00] and [0×08], is defined in the TOS field of an IP header.

Next, the device driver 303 compliant with a given network I/F performs processing of adding the priority tag of IEEE802.1D Tag when communication processing over an Ethernet (registered trademark) is performed. In this case, the device driver 303 selects and defines a priority tag value of IEEE802.1D Tag corresponding to the DSCP value defined in the TOS field of an IP header with reference to the priority correspondence table shown in FIG. 7. In other words, the device driver 303 performs processing adding one of [7], [5], [0] and [1] to an Etherheader.

For example, the priority, [QOS_STREAMING] is used for the original distribution of streaming data in the streaming transmission between the server A101 and the client A111 in the network connection example shown in FIG. 1. The application of the server A101 defines the DSCP value, [0×28], indicating the priority defined as communication priority information in the TOS field of an IP header in accordance with the specification in the priority correspondence table shown in FIG. 7 and by using an API of the TCP/IP stack.

Furthermore, for the Ether frame of streaming transmission, the device driver selects and defines the priority tag value of IEEE802.1D Tag corresponding to the DSCP value [0×28] defined in the TOS field of the IP header with reference to the priority correspondence table shown in FIG. 7. In other words, the priority tag, [5], of IEEE802.1D Tag is selected and is added to the Ether header.

The communication control portion 103 such as a home router (bridge) having received the Ether frame from the server A101 shown in FIG. 1 performs processing of interpreting and sending the priority value of IEEE802.1D Tag defined in the Ether frame to the wireless LAN 802.11g. In the processing, the Ether frame is processed as the one with the VI priority based on the Access Category value [VI] defined by WMM corresponding to the priority value [5] of the IEEE802.1D Tag with reference to the priority correspondence table shown in FIG. 7 and is transmitted with a higher priority than the traffic of a wireless LAN with a lower priority (such as BE and BK).

However, in the network connection example shown in FIG. 1, while the server A101 and the client A111 are performing video streaming transmission at 10 Mbps, the client B112 and the server B102 may also start video streaming at 10 Mbps. These two lines of data communication may be processed with the same priority, QOS_STREAMING. In other words, the communication control portion 103 such as a bridge relaying and controlling communication data processes the two data communications equally.

When the band is not sufficient for the two streaming transmissions in the wireless LAN connecting the communication control portion 103 such as a bridge and the clients A111 to C113 under the condition, the streaming data of both is not transmitted in realtime, causing interruption of images and/or voice/sound in streaming reproduction at both of the client A111 and the client B112.

In order to avoid the problem according to an embodiment of the invention, an Admission Control Phase for a predetermined period of time is provided when the new line of distribution of streaming data is started from the server. Thus, lower-priority data transmission is performed in which a lower priority is defined to the streaming data distribution than the originally defined priority.

In other words, in an Admission Control Phase for a predetermined period of time, data transmission is performed with a lower priority setting. Then, the state of the data transmission with the lower priority setting is examined, and whether the shift to the originally defined priority for the streaming transmission is allowed or not is determined based on the examination result. If so, the data transmission is performed after the shift to the originally defined priority for the streaming transmission.

The Admission Control Phase period is a low-priority data transmitting period with a lower priority than the priority used for streaming transmission. In this period, even different lines of streaming transmission are performed simultaneously, the influence to be given on the existing data transmission can be prevented. In other words, since the band for the distribution of existing streaming is not deprived, the reproduced images at the client reproducing the existing streaming are not disturbed.

The server itself, which is a data sender, examines the state of transmission in the lower-priority data transmission period. In other words, whether the given network band is sufficient for the transmission with the switched streaming priority or not, that is, whether the transmission with the switched streaming priority has no effect on the other existing streaming transmissions or not is examined. If the examination results in "no problem", the server starts the transmission after changing the setting to the originally defined, right priority for the streaming.

Figure 8:
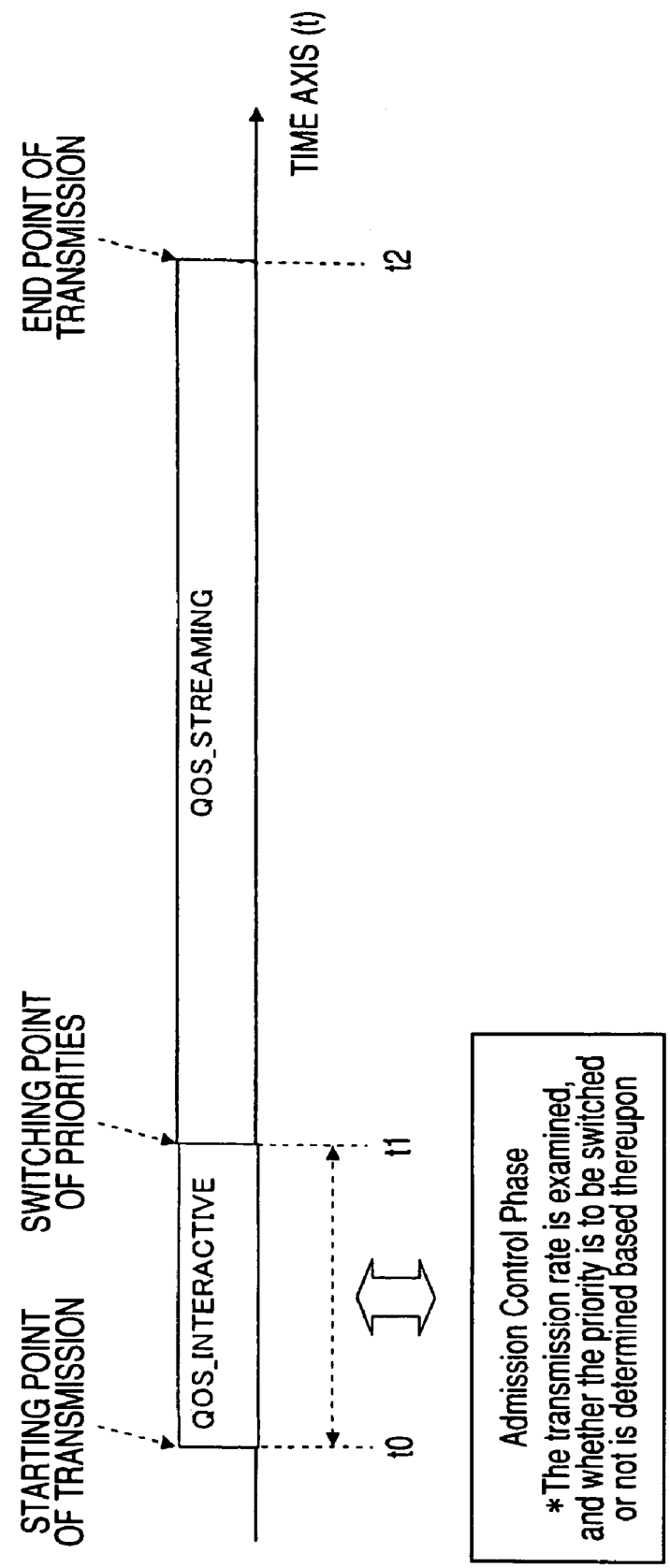
FIG. 8 is a diagram describing a data transmission sequence with Admission Control Phase defined.

Referring to FIG. 8, the data transmission sequence with the Admission Control Phase defined will be described. The period of the Admission Control Phase is a data transmission period with a lower priority defined than the priority originally defined for given streaming transmission.

The original priority originally defined for streaming transmission is:

(b) QOS_STREAMING of the four types of priority:

(a) QOS_CONTROL,
(b) QOS_STREAMING,
(c) QOS_INTERACTIVE, and
(d) QOS_BACKGROUND which are defined in the priority correspondence table shown in FIG. 7.

In this embodiment, a predetermined period (t0 to t1) from the start of the data transmission shown in FIG. 8 is the Admission Control Phase. For example, the predefined period such as about one minute from the start of transmission may be the Admission Control Phase.

In the Admission Control Phase, data transmission is performed with the lower priority [QOS_INTERACTIVE] defined than the priority [QOS_STREAMING], which is to be originally defined for the streaming transmission. Notably, the further lower priority [QOS_BACKGROUND] may be used instead.

In the Admission Control Phase defined in the beginning of the data transmission according to this embodiment, the processing of streaming data distribution is performed with [QOS_INTERACTIVE] as the defined priority. In the data transmission period with the setting of the lower priority, the state of the data communication is examined. In other words, whether the network band is sufficient for the transmission with the original priority [QOS_STREAMING] to be switched or not, that is, whether the transmission with the switched streaming priority [QOS_STREAMING] has no effect on the other streaming transmissions or not is determined. If the determination results in "no problem", the server starts the transmission after changing the setting to the right priority [QOS_STREAMING] for the streaming at the time (t1) shown in FIG. 8.

Figure 9:
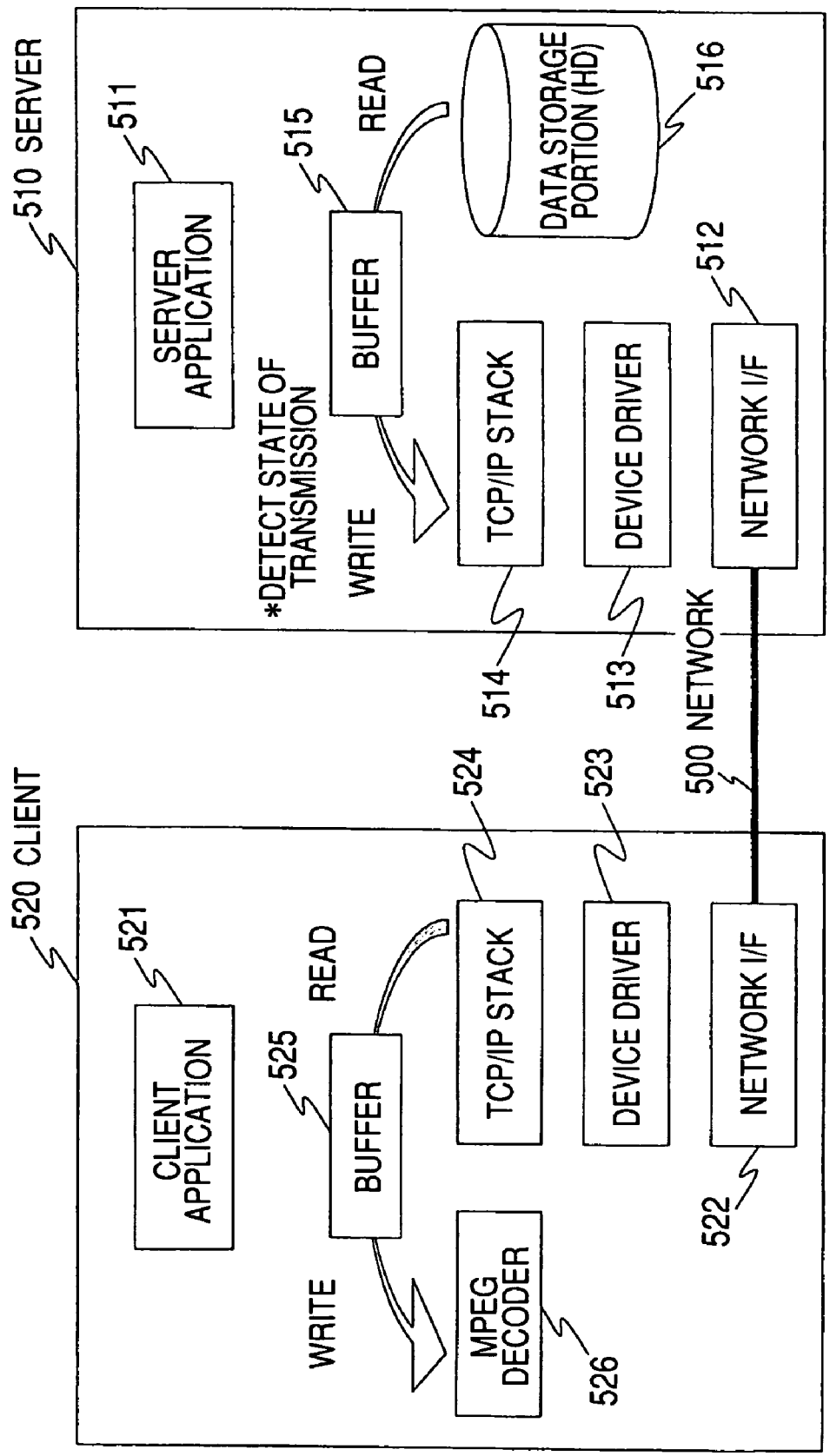
FIG. 9 is a diagram describing component constructions and processing of a server that performs streaming data distribution under HTTP and a client that performs streaming data reproduction.

Referring to FIG. 9, the components and processing of the server performing the distribution of streaming data under HTTP and the client reproducing the streaming data will be described. This embodiment describes an example of streaming transmission applying HTTP like the DLNA specification. HTTP applies TCP connection, and data transmission is performed under TCP flow control. When the client (receiver) receives data at an insufficient rate or when a sufficient transmission band therefor is not available in the network, the server (sender) is prevented from performing data transmission under the flow control by TCP protocol and may not maintain the transmission at the bit rate for MPEG stream.

DLNA guideline makes it mandatory for a client to have an ability for receiving a requested contents at the bit rate for MPEG stream. For example, for MPEG2 PS contents, since the maximum bit rate of MPEG stream is specified as 10.8 Mbps, the client may be assumed as having an ability for receiving at a transfer rate of 10.8 Mbps.

In other words, when the state in which the server may not transmit at the bit rate of MPEG stream is detected, the network state is determined in which the network band is not sufficient. According to DLNA specifications, whether a given client is requesting streaming transmission or requesting download transfer may be determined by checking the priority used for the transmission of an HTTP request or a specific header of the HTTP request.

The TCP flow control is performed by software of the TCP/IP stack. A server application 511 functioning as a communication control portion in a server 510 obtains AV contents designated in an HTTP request from a client from a data storage portion 516 and writes the AV contents data into a TCP/IP stack 514 through a buffer 515. In other words, as described with reference to FIG. 6, the server application 511 writes HTTP response data in the TCP stack by employing API of the TCP stack included in the TCP/IP stack 514.

The server application 511 monitors the speed of writing of the HTTP response data to the TCP/IP stack 514. When the client (receiver) receives data at a sufficient rate, the writing is performed at a speed in accordance with the speed of realtime reproduction to be performed by the client. When the client (receiver) does not receive data at a sufficient rate or when the network does not have a sufficient transmission band, the server (sender) is prevented from performing data transmission under the flow control by TCP protocol and may not perform writing at the bit rate of MPEG stream. The server application 511 determines whether a sufficient network band is available or not for the transmission of streaming data by monitoring the speed of writing of the HTTP response packet to the TCP/IP stack 514.

The TCP/IP stack 514 of the server 510, as described above with reference to FIG. 6, divides the HTTP response data (that is, the HTTP response data 321 shown in FIG. 6) as application data written in the TCP stack into TCP packets, adds a TCP header to each of the TCP packets, transfers the TCP packets from the TCP stack to the IP stack and creates IP packets with IP headers.

The server application 511 defines the API of the TCP/IP stack 514 such that the DSCP (Differentiated Service Code Point) indicating the priority as communication priority information can be added to the TOS field of each of the IP headers. Thus, a DSCP priority may be defined in each of the IP headers.

In the processing according to this embodiment of the invention, the DSCP value corresponding to the lower priority [QOS_INTERACTIVE] than the priority [QOS_STREAMING] to be originally defined for streaming transmission, that is, the DSCP value [0×00] in the table shown in FIG. 7 is defined in the initially defined Admission Control Phase.

The device driver 513 adds the Etherheader of the Ethernet (registered trademark) to each of the IP packets and outputs each of the IP packets to a network 500 through a network interface 512 as an Ether frame (that is, the Ether frame 323 shown in FIG. 6).

The device driver 513 refers to the DSCP priority value added to each of the IP headers of data received from a higher stack and thereby performs processing of adding the 802.1D Priority Tag corresponding to the DSCP priority value defined in each of the IP headers to the Either header. The output through the network interface 512 may perform the communication (such as IEEE802.11g) applying a wireless LAN by adding thereto Access Category information corresponding to the communication priority information (priority) defined by WMM, which has been described above with reference to FIG. 2, in the device driver 513.

In both cases, the 802.1D Priority Tag [0] corresponding to the DSCP value [0×00] corresponding to the lower priority [QOS_INTERACTIVE] than the priority [QOS_STREAMING] to be originally defined for streaming transmission or the Access Category information [BE] (see FIG. 7) defined by WMM is defined in the Admission Control Phase, which is implemented in the beginning of data transmission.

The client 520 may receive the Ether frame, for example, transmitted by the server through a network I/F 522. A device driver 523 extracts the IP packets from the Ether frame. A TCP/IP stack 524 obtains the HTTP response data from the IP packets, stores the AV stream data, which is MPEG contents, stored in the HTTP response data in a buffer 525. Then, an MPEG decoder 526 performs decoding processing thereon and reproduces and outputs the AV stream. These steps are performed under the control of the client application 521.

The balance between the amount of data of the contents transmitted from the server 510 side and the amount of contents-reproducing data on the client 520 side allows the success of the distribution and reproduction of streaming data. Thus, reproduction processing may be realized without delay, which prevents the interruption of reproduced data on the client side.

In order to transmit an MPEG2 stream, which is send contents, at a constant encoding bit rate, that is, contents encoded at a constant bit rate, the application 511 of the server 510 monitors the speed of writing of an HTTP response packet to the TCP/IP stack 514. Based on the information on the speed of writing, the client 520 may accurately determine whether send contents is being transmitted at a sufficient transfer rate for decoding and reproducing the contents or not. This is because the speed of writing of an HTTP response packet to the TCP/IP stack 514 corresponds to the speed of decoding and reproducing of contents in the client 520.

However, when Variable Bit Rate contents is transmitted, that is, when the encoding bit rate of an MPEG2 stream, which is contents to be transmitted from the server 510, varies, the information on the speed of writing of an HTTP response packet to the TCP/IP stack 514 does not correspond to the speed of decoding and reproducing of contents in the client 520.

For the transmission of Variable Bit Rate contents, the determination only based on the speed of writing of an HTTP response packet to the TCP/IP stack 514 may not be appropriate on whether the transfer bit rate is higher than a fixed bit rate or not, that is, whether the amount of contents transmission from a server is sufficient for the amount of reproduced contents on the client side or not.

Figure 10:
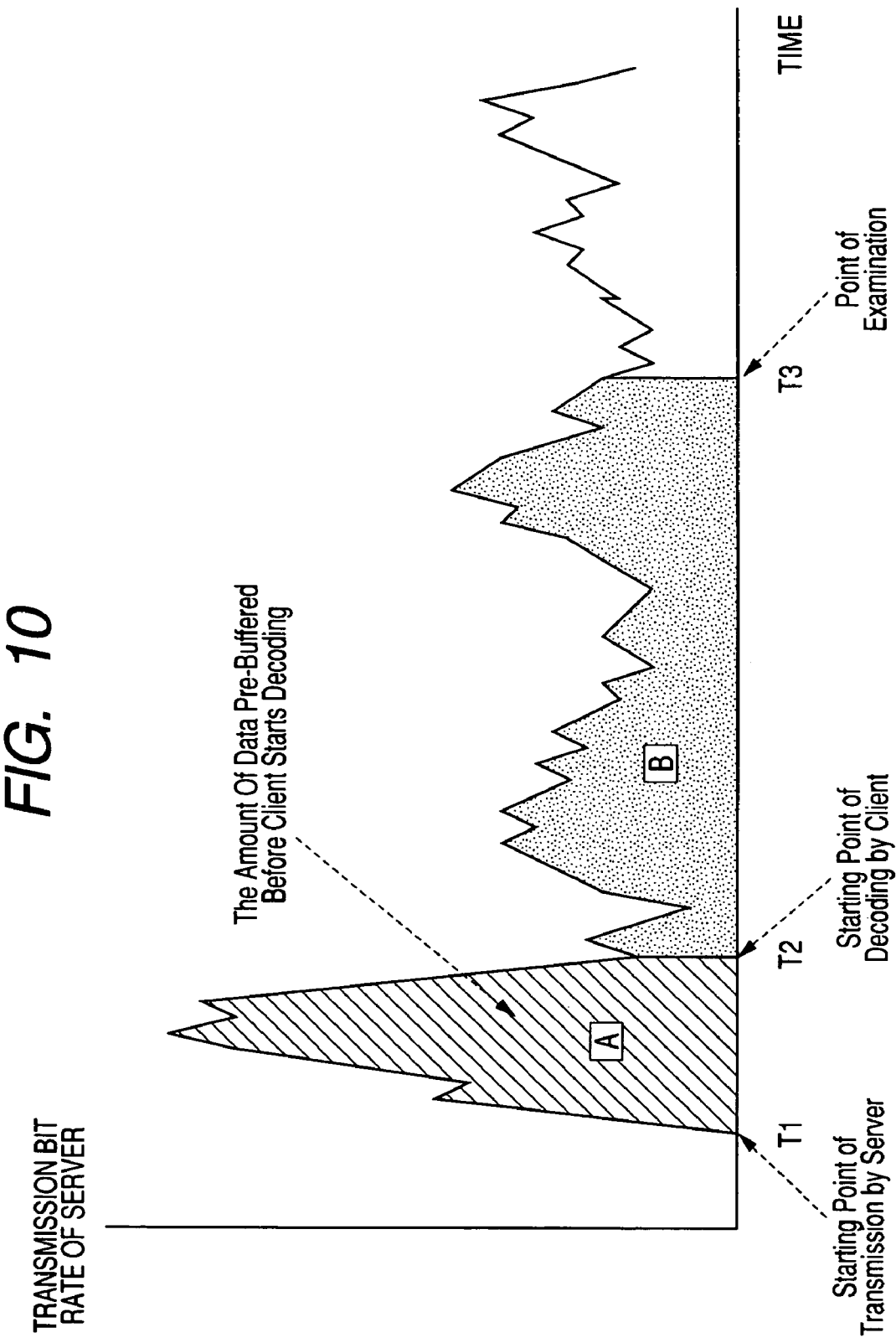
FIG. 10 is a diagram showing changes in transmission bit rate upon streaming transmission under HTTP.

According to an embodiment of the invention, processing for guaranteeing realtime reproduction on a client side is performed even for the transmission of the Variable Bit Rate contents. FIG. 10 shows changes in transmission bit rate upon streaming transmission by HTTP. The horizontal and vertical axes indicate elapsed times (T) and transfer bit rates of data transmitted by a server, respectively.

Against a network congestions in the middle of streaming transmission, every client performs pre-buffering in which a certain amount of received data is preliminary stored in a buffer thereof before starting decoding. For the implementation of the pre-buffering processing, a large amount of data is transmitted from a server at a time upon start of transmission of stream data. The period from time T1 to time T2 shown in FIG. 10 corresponds to a pre-buffering period.

Then, once a client starts decoding, the data transfer depends on the bit rate of the stream being transmitted and changes. The period after time T2 shown in FIG. 10 corresponds to decoding and reproducing time by a client. The part from time T1 to time T2 is the amount of data transferred during pre-buffering. When the buffer of a client depletes for a period of time, which may be required for reproducing the data, or longer in the middle of streaming transmission, the decoding fails. As a result, the picture and/or voice/sound of the moving pictures may be interrupted.

Therefore, the server functioning as a communication processing apparatus according to an embodiment of the invention determines that no buffer depletion occurs at a given client with a sufficient network band when:

(Examination Point)−(Decoding Starting Point at Client)<(Time Required For Reproducing Entire Data Transferred Until Examination Point)−(Time Required For Reproducing Pre-Buffered Data)     [Determination Equation 1]

is satisfied.

The equation will be described with reference to FIG. 10. In FIG. 10, the "Examination Point" is at time (T3). The "Decoding Starting Point at Client" is at time (T2). The "Time Required For Reproducing Entire Data Transferred to the Examination Point" is the amount of entire data that the server transmits in the period from time T1 to time T3. This is the total sum of the shown data A and B, that is, A+B. The "Time Required For Reproducing Pre-Buffered Data" is the time, which may be required for reproducing the shown data A.

In other words, the [Determination Equation 1] is, in FIG. 10:

(Period [T3 to T2])<(Time for Reproducing Data A+B)−(Time for Reproducing Data A)

In this equation, (Time For Reproducing Data A+B)−(Time For Reproducing Data A)=(Time For Reproducing Data B)

Therefore, whether (Period [T3 to T2])<(Time for Reproducing Data B)

is satisfied or not is determined. If the equation is satisfied, the server determines that no buffer depletion is occurring at the client and that the distribution and reproduction of streaming data is being successful.

However, the server may generally not determine the decoding starting point by a client, that is, time (T2) in FIG. 10. Thus, the amount of pre-buffered data (A) is not available. In this case, a setting may be adopted in which the client may inform the server of the amount of data (the number of bytes) to be pre-buffered or the time for reproducing data to be pre-buffered at a specific HTTP header upon HTTP request. Then, the server may determine whether sufficient data transmission for the processing of distributing and reproducing the streaming data is being performed or not by applying the [Determination Equation 1].

The processing applying [Determination Equation 1] may be achieved with a construction in which a server receives from a client either
- the amount of data (number of bytes) to be pre-buffered; or
- the time for reproducing data to be pre-buffered.

The end point (t1) of the Admission Control Phase, which has been described with reference to FIG. 8, may be defined as the examination point, that is, the examination point (T3) in FIG. 10. Then, at the time, the server may perform the examination and determination processing applying the [Determination Equation 1].

If the server determines that the [Determination Equation 1] is satisfied at the end point of the Admission Control Phase, the server determines that a sufficient band is available for the distribution of streaming data. Then, the server changes the priority setting to the original priority for the distribution of the streaming data, that is, the priority corresponding to [QOS_STREAMING] and continues the distribution of the streaming data.

If the server determines that the [Determination Equation 1] is not satisfied at the examination point, that is the end point of the Admission Control Phase, the server determines that a sufficient band is not available for the distribution of streaming data. Then, the server continues the Admission Control Phase as it is. In other words, the server continues the transmission at the priority setting lower than the original priority for the distribution of the streaming data. Alternatively, the server may perform user notification processing or may stop the data transmission.

When the server changes the priority setting to the original priority for the distribution of the streaming data, that is, the priority corresponding to [QOS_STREAMING] and continues the distribution of the streaming data, the server application first changes the setting of DSCP (Differentiated Service Code Point) indicating the priority, which is communication priority information defined in the TOS field of the IP header. Then, the device driver refers to the DSCP priority value added to the IP header upon addition of the Etherheader of the Ethernet (registered trademark) and may change the 802.1D Priority Tag corresponding to the DSCP priority value defined in the IP header or change the Access Category information corresponding to the communication priority information (priority) defined by WMM.

The priority changing processing may allow the QoS control and distribution of the streaming data with the original priority in the communication control portion 103 shown in FIG. 1.

However, as described above, the application of the [Determination Equation 1] may require the server to receive information on either
- the amount of data (number of bytes) to be pre-buffered; or
- the time for reproducing the data to be pre-buffered, and is not achieved and not generic with the setting that the client does not provide the information.

An example of processing, which can be achieved even when the notification of the information is not available from a client, will be described below. In the processing example to be described below, the state of the distribution of streaming data is determined by ignoring the pre-buffering time at a client.

Since the time for pre-buffering contents at a client, that is, the period (T1 to T2) shown in FIG. 10 is generally about one second, it may be ignored and then the examination time (T3) may be always defined to a predetermined period of time such as one minute after the start of server transmission. In other words, in the example shown in FIG. 10, the elapsed time from the start of transmission (T1) is only measured, and the examination is performed at the predetermined examination point (one minute from the start of transmission, for example).

A determination equation is created based on the period from the examination point (T3) to the starting point of server transmission (T1) and the time which may be required for reproducing entire data transferred until the examination point. That is:

(Examination Point)−(Starting Point Of Server Transmission)<(Time Required For Reproducing Entire Data Transferred Until Examination Point)   [Determination Equation 2]

The equation will be described with reference to FIG. 10.

The "(Examination Point)−(Starting Point of Server Transmission)" is a period T3−T1 in FIG. 10.

The "(Time Required For Reproducing Entire Data Transferred Until Examination Point)" is a time, which may be required for reproducing transmitted data (A+B).

The equation is for determining whether the time for reproducing the total amount of pre-buffered data A and the data B after the start of decoding and reproducing is longer than (Examination Point)−(Starting Point Of Server Transmission) or not at the client side. In other words, the occurrence of buffer depletion at a client and/or the sufficient band availability for streaming data distribution is/are determined based on the comparison between the time from the start of transmission to the examination point and the time required for reproducing the amount of data transmitted until the examination point.

If the [Determination Equation 2] is satisfied, the state is determined that no buffer depletion occurs at the client and that the distribution and reproduction of streaming data is being successful. The application of the [Determination Equation 2] results in a merit that the average state of transmission in one minute can be examined.

Figure 11:
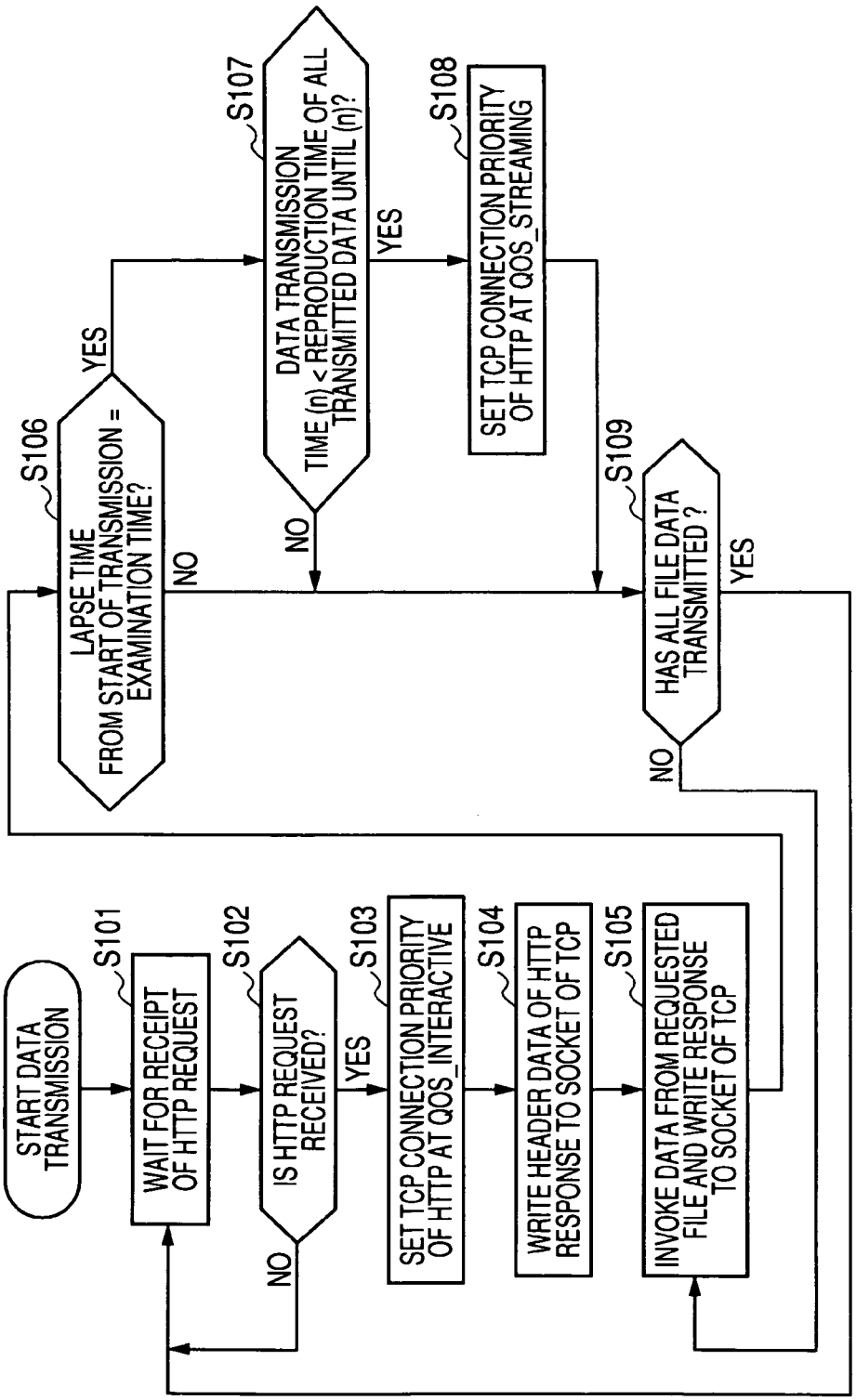
FIG. 11 is a diagram showing a flowchart describing a processing sequence of streaming transmission processing to be performed by a server.

Finally, referring to FIG. 11, a processing sequence of streaming transmission processing to be performed by a communication processing apparatus, that is, a server according to an embodiment of the invention will be described. The processing shown in FIG. 11 is performed as processing by a communication control portion of the server performing data transmission processing, more specifically, as processing by a server application.

In step S101 first of all, the server waits for the receipt of an HTTP request from a client. In step S102, if the receipt of the HTTP request with a contents request from the client is determined, the processing moves to step S103 where the TCP connection priority of HTTP is defined to [QOS_INTERACTIVE]. In other words, the processing of the Admission Control Phase, which has been described with reference to FIG. 8 and so on, is started, and the processing of setting a lower priority than the priority [QOS_STREAMING] for the distribution of streaming data is performed.

In step S104, HTTP response header data is written into a TCP socket. In step S105, the contents data designated by the HTTP request received from the client is obtained from a hard disk, for example, and the processing of writing the HTTP response to the TCP socket is performed. These steps correspond to the processing of writing an HTTP response to the TCP/IP stack 302 by the application 301, which has been described with reference to FIG. 6.

Based on the writing processing data, an IP packet is created by the TCP/IP stack 302 shown in FIG. 6 and an Ether frame, for example, is created by the device driver 303. Then, the result is transmitted to the client. The processing shown in FIG. 11 is processing of executing the server application and is omitted herein.

When the priority setting and the processing of writing HTTP response data to the TCP stack are performed at steps S103 to S105, the server application in step S106 measures the elapsed time from the start of data transmission, that is, the start of processing of writing HTTP response data to the TCP stack and determines the time has reached a predetermined examination time or not. The examination time is the time of the end of the Admission Control Phase defined upon start of data transmission, which has been described with reference to FIG. 8 and corresponds to the time of the examination point in FIG. 10. For example, the examination time is a point in time after one minute from the start of data transmission.

If the server application determines that the time has not reached the examination time in step S106, the processing moves to step S109. Unless the transmission of entire file data completes, the processing of data writing in step S105 is continued.

If the server application determines that the time has reached the examination time in step S106, that is, determines that the time has reached to the examination point shown in FIG. 10, the processing moves to step S107 where whether Data Transmission Time (n)<Time For Reproducing Entire Data Transmitted Until (n)

is satisfied or not is determined.

This is determination processing corresponding to the [Determination Equation 2]. The "Data Transmission Time (n)" is the period from the start of data transmission from the server to the examination time and corresponds to:

t0 to t1 in FIG. 8; and

T1 to T3 in FIG. 10.

The "Time For Reproducing Entire Data Transmitted Until (n)" corresponds to:

the time for reproducing the data (A+B) in FIG. 10.

If the satisfaction of

Data Transmission Time (n)<Time For Reproducing Entire Data Transmitted Until (n)

is determined in step S107, it is determined that no depletion of buffered data is occurring at the client and that a sufficient band is available for the distribution of streaming data. Then, the processing moves to step S108 where the Admission Control Phase ends and the priority setting is changed to the original priority for the distribution of streaming data, that is, to the priority corresponding to [QOS_STREAMING]. Then, the distribution of streaming data is continued.

Furthermore, in step S109, whether the transmission of entire file data has completed or not is determined, and the transmission with the priority setting at [QOS_STREAMING] is continued until the transmission of entire file data completes.

On the other hand, if it is determined that

Data Transmission Time (n)<Time For Reproducing Entire Data Transmitted Until (n)

is not satisfied in step S107, it is determined that depletion of buffered data is occurring at the client and that a sufficient band is not available for the distribution of streaming data. Then, the priority setting is not changed to the original priority for the distribution of streaming data, that is, to the priority corresponding to [QOS_STREAMING]. Then, the processing moves to step S109, and the communication with the low priority [QOS_INTERACTIVE] is continued until the completion of the communication.

Not being shown in the flow, if it is determined that

Data Transmission Time (n)<Time For Reproducing Entire Data Transmitted Until (n)

is not satisfied in step S107, processing of informing a user that the distribution of streaming data with a sufficient band is difficult and/or processing of ending the communication may be performed.

As described above, in the construction according to an embodiment of the invention, a server performing new streaming distribution defines an Admission Control Phase, which is a period with a lower priority defined than the original priority for the streaming data distribution upon start of the data transmission, determines the occurrence of buffer depletion at a client and the state of sufficient band availability for the streaming data distribution are determined based on the comparison between the time until an examination point, which is the point in time of the end of the Admission Control Phase, and the time which may be required for reproducing the amount of data transmitted until the examination point, and, only if the server determines a sufficient band is available based on the determination, performs the data distribution with the original priority setting for the streaming data distribution.

With the construction, when the start of new distribution of streaming data is attempted while other streaming distribution is being performed, for example, the communication interference does not occur in which the band for the existing streaming distribution is deprived, resulting in delay of data distribution in the existing streaming distribution. Therefore, the client reproducing and/or viewing the existing streaming data is adversely affected.

Having described the method in which a server side handles the transfer rate by HTTP streaming transmission in the embodiment, the determination on whether a sufficient network band is available or not may be performed by the server side with a system in which a client may feedback the transfer state to the server by RTCP, for example, for RTP streaming transfer.

Having described in the embodiment that, in an Admission Control Phase, [QOS_INTERACTIVE] is used as the priority setting, and that the priority used for the file transfer of a still image is used, another priority may be defined between [QOS_INTERACTIVE] and [QOS_STREAMING]. Then, the new priority may be handled as a special priority for using an Admission Control Phase. However, in this case, the priority value corresponding thereto may be required to define in the specification of each link layer.

It is assumed in the embodiment that an MPEG streaming stored on a hard disk is transmitted as it is. However, if it is determined that a sufficient network band is not available at an examination point, for example, a stream with a reduced bit rate is created in realtime from the original stream by hardware such as a translator. After the bit rate of the transmitted stream is adjusted so as to allow the streaming distribution and reproduction even in the data transmission with a smaller band, the priority may be shifted to the original priority of the streaming.

In the embodiment, whether priority changing is performed or not is determined based on the examination result at an examination point at the end of an Admission Control Phase. However, transmission may be simply performed with a lower priority for several seconds in the beginning of streaming, and the shift to the original priority of the streaming may be performed automatically. Though, as described with reference to FIG. 10, a temporary increase in transfer rate is caused by pre-buffering, the use of a lower priority in the period may prevent an influence on the other streamings.

The embodiments of the invention have described above in detail. However, it is self-evident that those skilled in the art can change and/or alter the embodiments without departing from the scope of the invention. In other words, the invention has been disclosed in the illustrative forms and should not be interpreted limitedly. The substance of the invention should be determined in consideration of the appended claims.

The series of processing described herein may be executed by hardware, software or a combined construction of both. The execution of the processing by software may be achieved by installing and executing a program recording the processing sequences in a memory within a computer built in specific hardware or by installing and executing the program in a generic computer in which various processing is executable.

For example, the program may be recorded in a hard disk or a Read-Only Memory (ROM) as recording media in advance. Alternatively, the program may be temporarily or permanently stored (or recorded) in a removable recording medium such as a flexible disk, a Compact Disc Read-Only Memory (CD-ROM), a Magneto optical (MO) disk, a Digital Versatile Disc (DVD), a magnetic disk and a semiconductor memory. Such a removable recording medium can be provided as so-called package software.

In addition to the install from a removable recording medium as described above to a computer, the program may be transferred from a download site to a computer in a wireless manner or may be transferred to a computer over a network such as a Local Area Network (LAN) and the Internet in a wired manner. The computer may receive the program transferred in this way and install it in a recording medium such as a self-contained hard disk.

The processing described herein may be not only executed in the time-series manner as described herein but also may be executed in parallel or separately in accordance with the processing ability of an apparatus, which executes the processing, or as required. The system herein is a logical set construction of multiple devices, and the component devices are not always accommodated in one cabinet.

As described above, in the construction according to the embodiments of the invention, a communication processing apparatus (server) that distributes streaming data starts data transmission with a lower priority defined than the priority for the original streaming data distribution upon start of data transmission and examines the state of communication in a period with the low priority at an examination point. For example, based on the comparison between the time until the examination point and the time required for reproducing the amount of data transferred until the examination point, the occurrence of the deletion of the buffer at a client and the state of band availability for streaming data distribution are determined. Then, only if it is determined that a sufficient band is available based on the determination, data distribution is performed with original priority setting for streaming data distribution. Thus, when the distribution of new streaming data is started while another streaming distribution is being performed, a good communication atmosphere may be maintained without communication interference that the band for the existing streaming distribution is deprived, resulting in delay in the existing streaming distribution.

It should be understood by those skilled in the art that various modifications, combinations, sub-combinations and alterations may occur depending on design requirements and other factors insofar as they are within the scope of the appended claims or the equivalents thereof.

What is claimed is:

1. A communication processing apparatus for transmitting streaming data on a network, the apparatus comprising:
   a processor;
   a communication control portion:
   transmitting the streaming data under a low priority setting for an initial period;
   examining, at the end of the initial period, a state of data communication on the network, the examining including determining whether the following inequality is satisfied: (the initial period)<(an amount of time for reproducing the streaming data transmitted during the initial period); and
   when it is determined that the inequality is satisfied:
   changing the priority setting of the streaming data from the low priority setting to a high priority setting; and
   transmitting the streaming data under the high priority setting; and
   a network interface outputting on the network the transmitted streaming data.

2. The communication processing apparatus according to claim 1, wherein the communication control portion further:
   examines a state of data communication on the network while the streaming data is transmitted under the high priority setting; and
   reduces a bit rate of the transmitted streaming data based on a result of the examination.

3. The communication processing apparatus according to claim 1, wherein the communication control portion further:
   examines a state of data communication on the network while the streaming data is transmitted under the high priority setting; and
   stops the streaming data transmission or notifies a user based on a result of the examination.

4. The communication processing apparatus according to claim 1, wherein the communication control portion further:
   obtains an amount of the transmitted streaming data output on the network based on an amount of HTTP response data written to a TCP stack, and
   examines the state of communication on the network based on the obtained amount of data.

5. A computer-implemented communication control method for streaming data to a client over a network, the method comprising:
   transmitting, by a processor associated with the computer, the streaming data on the network under a lower priority setting than a predetermined priority setting for an initial period of;

examining, by the processor at the end of the period, a state of data communication on the network under the lower priority setting, the examining including determining whether the following inequality is satisfied: (the end of the period)−(a decoding start time of the client)<(an amount of time for reproducing the streaming data transmitting during the initial period)−(an amount of time for reproducing streaming data pre-buffered by the client); and when it is determined that the inequality is satisfied:
changing, by the processor, the priority setting of the streaming data from the lower priority setting to the predetermined priority setting; and
transmitting, by the processor, the streaming data on the network under the predetermined priority setting.

6. The communication control method according to claim 5, wherein examining includes receiving, by the processor, at least either an amount of the pre-buffered data or the decoding starting time from the client.

7. The communication control method according to claim 5, further comprising:
examining, by the processor, a state of data communication on the network when transmitting the streaming data under the predetermined priority setting; and
reducing a bit rate of the transmitted streaming data based on a result of the examination.

8. The communication control method according to claim 5, further comprising:
examining, by the processor, a state of data communication on the network when transmitting the streaming data under the predetermined priority setting; and
stopping, by the processor, the streaming data transmission or notifying, by the processor, a user based on a result of the examination.

9. The communication control method according to claim 5, wherein the examining includes obtaining, by the processor an amount the transmitted streaming data based on an amount of HTTP response data written to a TCP stack, and the method further includes examining, by the processor, the state of communication on the network based on the obtained amount of data.

10. A computer-readable storage medium storing a computer program for causing a communication processing apparatus to perform a method for transmitting streaming data to a client over a network, the method comprising:
transmitting the streaming data over the network under a lower priority setting than a predetermined priority setting for an initial period;
examining step, at the end of the initial period, a state of data communication on the network under the lower priority setting, the examining including determining whether the following inequality is satisfied: (the end of the period)−(a decoding start time of the client)<(an amount of time for reproducing the streaming data transmitting during the initial period)−(an amount of time for reproducing streaming data pre-buffered by the client); and
when it is determined that the inequality is satisfied, changing the priority setting of the transmitted streaming data from the lower priority setting to the predetermined priority setting.

* * * * *